United States Patent
Grimminger et al.

(10) Patent No.: US 9,785,210 B2
(45) Date of Patent: Oct. 10, 2017

(54) HOUSEHOLD APPLIANCE HAVING A CONTROLLER FOR AN ELECTRICAL ENERGY SUPPLY NETWORK HAVING AN ASSOCIATED DATA NETWORK AND METHOD FOR OPERATING A CONTROLLER OF A HOUSEHOLD APPLIANCE ON SAID ENERGY SUPPLY NETWORK

(75) Inventors: Jochen Grimminger, Tapfheim (DE);
Tanja Haberlander, München (DE);
Claudia Häpp, München (DE)

(73) Assignee: BSH Hausgeraete GmbH, Munich (DE)

( * ) Notice: Subject to any disclaimer, the term of this patent is extended or adjusted under 35 U.S.C. 154(b) by 700 days.

(21) Appl. No.: 13/877,336

(22) PCT Filed: Sep. 22, 2011

(86) PCT No.: PCT/EP2011/066526
§ 371 (c)(1),
(2), (4) Date: Apr. 2, 2013

(87) PCT Pub. No.: WO2012/045596
PCT Pub. Date: Apr. 12, 2012

(65) Prior Publication Data
US 2013/0197709 A1    Aug. 1, 2013

(30) Foreign Application Priority Data
Oct. 7, 2010    (DE) .......................... 10 2010 042 172

(51) Int. Cl.
*G06F 1/26* (2006.01)
*D06F 33/02* (2006.01)
(Continued)

(52) U.S. Cl.
CPC ................ *G06F 1/26* (2013.01); *D06F 33/02* (2013.01); *G05B 19/0426* (2013.01);
(Continued)

(58) Field of Classification Search
USPC ...................... 327/548; 703/18; 713/300, 330
See application file for complete search history.

(56) References Cited

U.S. PATENT DOCUMENTS 7,162,379 B2    1/2007    Jang et al.
8,744,638 B2 *  6/2014    Tyagi ........................ H02J 3/14
                                                              307/31
(Continued)

FOREIGN PATENT DOCUMENTS

DE          19502786 A1    8/1996
DE       102007032052 A1    1/2009
(Continued)

OTHER PUBLICATIONS

International Search Report PCT/EP2011/066526 dated Jan. 4, 2012.
National Search Report DE 10 2010 042 172.3 dated Jul. 4, 2011.

*Primary Examiner* — Mohammad Ali
*Assistant Examiner* — Sheela S Rao
(74) *Attorney, Agent, or Firm* — Laurence A. Greenberg; Werner H. Stemer; Ralph E. Locher

(57) ABSTRACT

A household appliance includes a controller operating on an energy supply network having a data network for exchanging data via the energy supply network, wherein the network may include smart metering. The controller has a first control component embodies as a computer, a second control component for settings data, a third control component for operating data, and a fourth control component connected with the first control component and including a graph algorithm. The first control component determines data for controlling actuators from the settings data and the
(Continued)

operating data. Through cooperation of the first control component, the fourth control component and the graph algorithm, the data from the data network for the household appliance are taken into account so as to allow operation of the household appliance always to continue. A corresponding method for operating such household appliance is also described.

20 Claims, 2 Drawing Sheets

(51) Int. Cl.

| | |
|---|---|
| *G05B 19/042* | (2006.01) |
| *H02J 13/00* | (2006.01) |
| *H04B 3/54* | (2006.01) |
| *A47L 15/46* | (2006.01) |
| *H02J 3/14* | (2006.01) |
| *F24C 7/08* | (2006.01) |

(52) U.S. Cl.
CPC .............. *H02J 13/002* (2013.01); *H04B 3/54* (2013.01); *A47L 15/46* (2013.01); *F24C 7/08* (2013.01); *H02J 2003/143* (2013.01); *H02J 2003/146* (2013.01); *H04B 2203/5458* (2013.01); *Y02B 70/3241* (2013.01); *Y02B 90/2615* (2013.01); *Y02B 90/2692* (2013.01); *Y04S 20/227* (2013.01); *Y04S 40/121* (2013.01); *Y04S 40/146* (2013.01)

(56) References Cited

U.S. PATENT DOCUMENTS

| | | |
|---|---|---|
| 2008/0028083 A1 | 1/2008 | Rezvani et al. |
| 2008/0272934 A1 | 11/2008 | Wang et al. |
| 2009/0046587 A1* | 2/2009 | Kothari ................... H04L 45/12 370/238 |
| 2009/0307850 A1 | 12/2009 | Czyzewski et al. |
| 2010/0063644 A1* | 3/2010 | Kansal ................... G06Q 30/02 700/295 |
| 2010/0241243 A1 | 9/2010 | Hans et al. |
| 2012/0174117 A1* | 7/2012 | Jula ....................... G06F 9/5088 718/105 |

FOREIGN PATENT DOCUMENTS

| | | |
|---|---|---|
| DE | 102008043914 A1 | 5/2010 |
| DE | 102008062349 A1 | 6/2010 |
| JP | H10282161 A | 10/1998 |
| KR | 100665268 B1 | 1/2007 |
| WO | 0241569 A2 | 5/2002 |
| WO | 2010043597 A1 | 4/2010 |

\* cited by examiner

HOUSEHOLD APPLIANCE HAVING A CONTROLLER FOR AN ELECTRICAL ENERGY SUPPLY NETWORK HAVING AN ASSOCIATED DATA NETWORK AND METHOD FOR OPERATING A CONTROLLER OF A HOUSEHOLD APPLIANCE ON SAID ENERGY SUPPLY NETWORK

BACKGROUND OF THE INVENTION

The invention relates to a household appliance having a controller, which has key components in the form of a computer-like control part, a control part for settings data, a control part for operating data and actuators, which are activated by way of amplifiers, wherein data for activating the actuators is determined by the computer-like control part from the settings data and the operating data, wherein operation of the controller is provided on a novel energy supply network having a data network for exchanging data by way of said energy supply network.

The invention also relates to a method for operating a controller of a household appliance on a novel energy supply network with a data transmission of data by way of said energy supply network, wherein settings data of the controller, operating data from the process of the household appliance and data from the energy supply network are processed by a computer, in order to be able to determine control variables for actuators of the household appliance.

Such a household appliance and method are disclosed respectively by each of the documents US 2010/0063644 A1, US 2008/0272934 A1 and DE 10 2008 062 349 A1.

Household appliances or domestic appliances refer in the following to appliances used to manage a household. They can be large appliances, for example washing machines, tumble dryers, dishwashers, ovens, cookers, extractor hoods, refrigeration appliances, combined refrigerator/freezers or air conditioning appliances. However they can also be small appliances, for example coffee makers or food processors.

As background to the invention it is taken into account that the operation of household appliances of a household, for which the supply of electrical energy by a public energy supplier by means of an associated supply network takes place with the operator being for the energy consumed, is subject to significant change, as in future public energy suppliers will be obliged by statutory requirements to offer load-variable and time-dependent tariffs. Within the context of such statutory changes the traditional meters for recording the energy consumed in a household are being replaced by smart meters, which are able to display the current electricity tariff or supply it as a tariff signal in a wired or wireless manner to the household appliance operator. Smart metering is associated with further facilities offered by the energy supply network relating to a comprehensive data exchange in the electrical energy supply network between one and more generators and a number of consumers of electrical energy, so that it can justifiably be claimed that the energy supply network has intelligence or is smart. This can also include the energy supply network being provided with electricity management.

In the past the operator of a household appliance wanting to utilize a lower electricity tariff had to organize the operation of the respective household appliance by preselecting a start time for the appliance so that a low electricity tariff was actually utilized. It was therefore necessary to take account of the tariff structure of a provider of electrical energy, which was however generally the same in respect of the time sequence in respect of an electrical energy provider.

The new, in particular statutory, requirements mean that the tariffs can switch from high to low within very short time periods, for example of minutes or even seconds. However restrictive requirements can also be placed on the consumer wishing to operate the household appliance in his/her household just as quickly, so that a restriction on the purchase of electrical energy per unit of time, in other words reduced power uptake or even an interruption of the power uptake, has to be taken into account for a time.

DE 10 2008 062 349 A1 specifies strategies for household appliances, such as washing machines, dryers or dishwashers, which are operated in a smart manner on energy supply networks, setting out how the household appliances, of a household for example, can be operated in a price-optimum manner in times of low electricity purchase costs. According to the disclosure of this publication the household appliances are simply considered as ohmic consumers of high power rating, without the process sequence of the household appliances being examined more closely, in particular in respect of the process result, when utilizing low electricity tariffs and the interruptions that become necessary in between due to higher electricity tariffs or network-side requirements for avoiding power surges.

DE 10 2008 043 914 A1 discloses a system, with which at least two household appliances connected to a common energy supply can be operated, without exceeding a maximum quantity of energy supplied instantaneously by way of the energy supply, by allocating at least one household appliance a quantity of energy that is smaller than the quantity of energy required instantaneously in respect of its process sequence. It is also possible here to take into account the point in the process sequence reached by the household appliances connected to the common energy supply in each instance and to allocate a smaller quantity of energy to the household appliance, the process of which can more readily be reduced or operated with a smaller quantity of energy. This takes account of a relative restriction of a single household appliance.

DE 10 2006 029 950 A1 discloses the implementation of an expert system in the control unit of a household appliance, for example a washing machine.

It can be learned from DE 10 2008 042 832 A1 how to proceed with an electronic controller for the type of household appliances addressed in the invention to ensure operation readiness (standby mode) and if the energy supply network fails, so that no data loss results for the correct operation of the electronic controller. A specially designed readiness module is provided according to this publication.

In contrast it is the object of the invention to be able to operate at least one household appliance having an associated controller on a novel electrical energy supply network with inherent intelligence, with transmitted data from the energy supply network being taken into account with settings data of the household appliance that is also available. The settings data is initiated by the user of the household appliance, who can intervene interactively in the program sequence.

A method for operating a controller of a household appliance is also to be specified, with the aid of which the controller can perform operation on the described energy supply network.

BRIEF SUMMARY OF THE INVENTION

This object is achieved for the household appliance mentioned in the introduction in that the computer-like control part is connected to a control part, in which a graph algorithm is implemented, wherein it can be made possible, by means of the interaction of the control parts for data of the data network of the energy supply network available for the household appliance to be taken into account so that operation of the household appliance can always be continued.

In respect of the method mentioned in the introduction the object is achieved in that the computer takes into account a graph algorithm when executing its processing steps, so that modified process sequences of the household appliance, which are brought about when data of the data network of the energy supply network is taken into account, can be linked to one another in such a manner that operation of the household appliance can always be continued.

It is part of the essence of the invention that the newly created process sequence of the household appliance is based on a succession of individual, incomplete or partial program segments, which are made executable in an optimum manner by the claimed graph algorithm.

The invention is advantageously developed by the claims that are dependent on the independent claims.

The selection of an algorithm such as Dijkstra's algorithm provides an algorithm, which has already been widely introduced in appliance engineering, in particular for navigation devices, and therefore can be used more readily in appliance engineering.

Because the actuators can be operated by means of parameterization, i.e. allocation of a parameter by the controller for each power stage for activating a respective actuator, very different effects can be achieved by the actuator, which allow reduced operation of the household appliance in respect of energy consumption in particular on receipt of data from the network indicating a higher tariff for energy consumed or restrictive requirements. In such an instance the process can be continued—albeit more slowly—without a possibly detrimental stoppage having to be accepted.

If the actuators are electric motor drives, it is also possible to initiate a recovery or energy feedback into the energy network with such parameterization.

As the underlying energy supply network having the associated data network is available for a comprehensive exchange of data, the data can also include data which allows the execution of energy management with at least one further household appliance. It is thus possible to divide a quantity of energy, which is available in a household for certain time segments possibly in a limited manner, between two or further household appliances according to expediency.

The data network assigned to the novel energy supply network for the transmission of data can be formed directly by energy-transmitting lines of said energy supply network. Modulation, generally of the carrier frequency, as provided with Powerline, Z-Wave or ZigBee, is then taken into account.

However data transmission by way of the internet or a radio transmission link can also be selected. Such transmission links then have the same effect as a data network connected physically to the energy supply network.

BRIEF DESCRIPTION OF THE DRAWINGS

The invention is described in more detail schematically in the following based on exemplary embodiments illustrated in the drawing. Identical reference characters designate identical or comparable parts. The figures in the drawings are first described briefly.

DETAILED DESCRIPTION OF EXEMPLARY EMBODIMENTS OF THE PRESENT INVENTION

Figure 1:
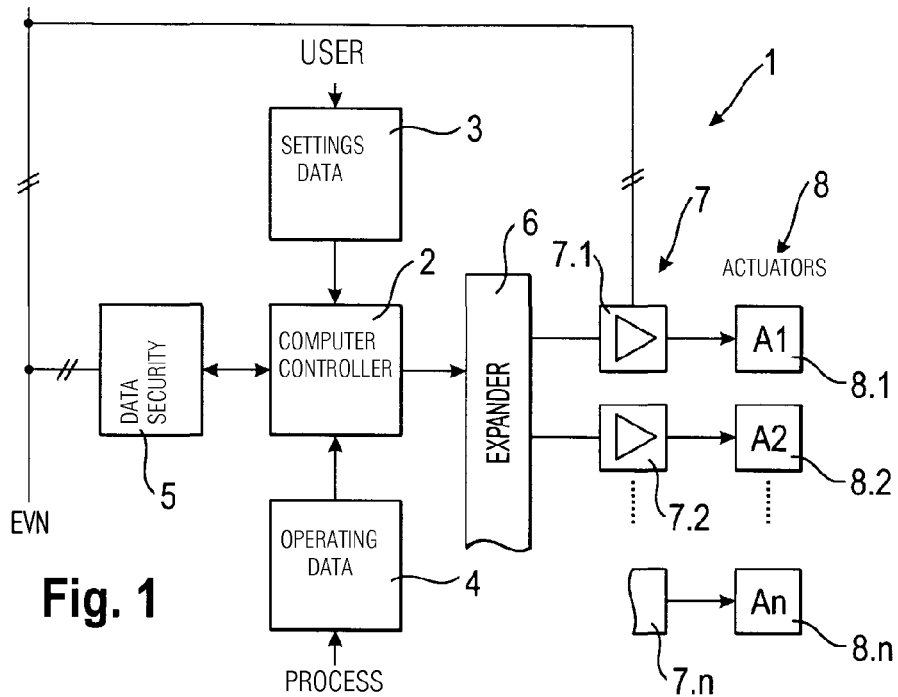
FIG. 1 shows a block diagram of a controller of a household appliance for operation on a conventional electrical energy supply network.

A conventional structure of a household appliance can be represented as follows with reference to FIG. 1. The reference character 1 designates the entire controller of the household appliance, the appliances covered by the term household appliance having already been listed above. An operator uses buttons and knobs, in some instances with feedback to said operator by way of a display, to generate the settings data for the program sequence in an input part 3 of the household appliance. A controller, which generally has a computer-like structure in the manner of an electronic controller 2, can use the settings data to calculate a generally fixed program sequence of the household appliance, which ultimately only additionally uses operating data, in other words data originating from measuring sensors, to convert the physical values occurring during the operating sequence of the household appliance to electrical signals. The operating data is brought together and made available in the control part 4 and supplied to the electronic controller 2 for retrieval. Power amplifiers or power switching stages 7 are assigned to the electronic controller 2 at its output region by way of an expander, to perform the corresponding power transmissions to actuators 8, such as motors, electric heaters, electrically actuated valves and the like. Said actuators 8 use the energy supplied by and available from a supply network EVN to bring about the process sequence in the household appliance. For example wash liquor is heated by way of flow-through heaters and transported to the dishes to be cleaned using the mechanical system of the household appliance, for example the spray arm of a dishwasher. A pump operated by an electric motor ensures that the wash liquor jet directed onto the dishes to be cleaned as it exits the spray arm is at the appropriate pressure. In the simplest instance it can be assumed that the electrical energy supply network EVN is available to supply energy to the household appliance in question without interruption but at a constant tariff for the electrical energy drawn. If it is assumed that this is relatively frequently not the case, the controller 1 or the electronic controller 2 is provided with a supplementary control part 5 to maintain its operation readiness so that the data or process data last obtained and processed is not lost even if the supply network EVN fails temporarily and a process sequence once initiated by the user can be continued. The control part 5 can also ensure that operation readiness (standby mode) is present, so that it is ultimately possible to control the household appliance remotely. An input command to start a program sequence is therefore never lost, even if the energy supply network should fail or be deactivated instantaneously. The tariff for the electrical energy drawn however presumably remains the same, if necessary also as a function (repeatably) of time. The household appliance therefore does not need a specific controller to respond to—spontaneous—tariff changes.

As a result the respective process result is achieved directly as an objective (for example washed and drained laundry in the case of a washing machine, cleaned and dried dishes in the case of a dishwasher) in the household appliance, as when a vehicle reaches its destination traveling in a straight line from its starting point.

Figure 2:
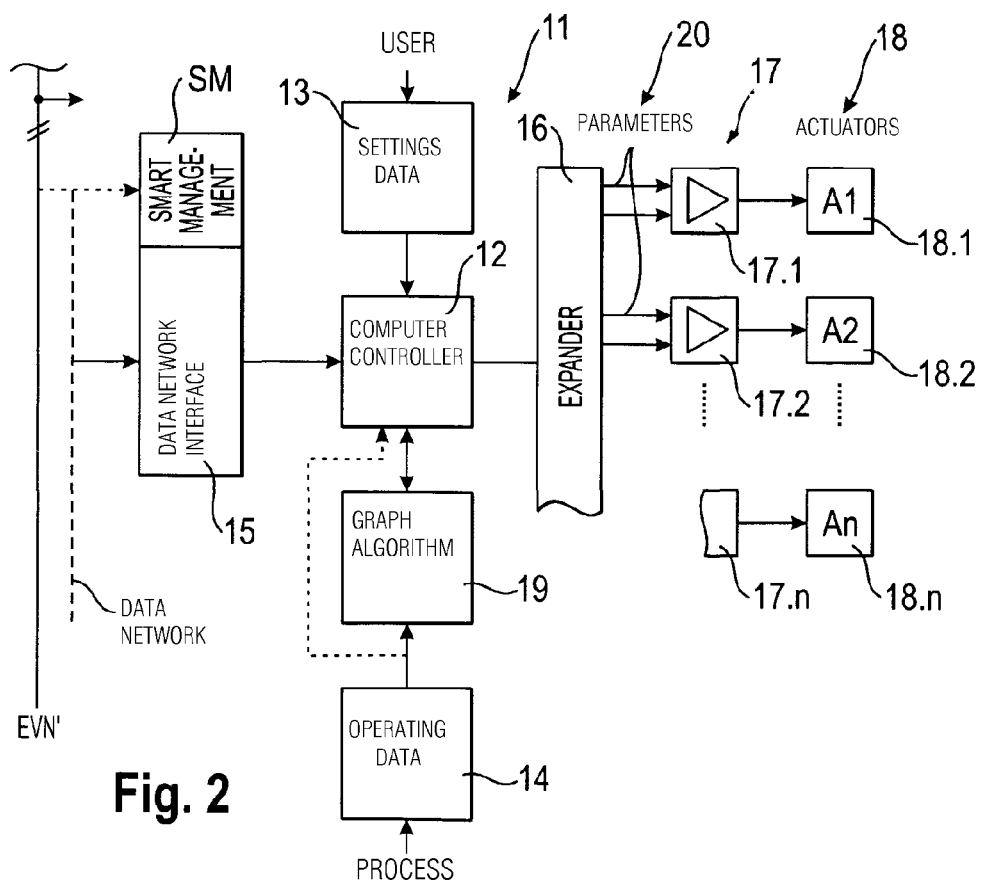
FIG. 2 shows a block diagram of a controller of a household appliance for operation on a novel energy supply network.

However if an electrical supply network EVN' in the form of a novel supply network with intelligence is taken into account, changing energy or electricity tariffs in particular have to be considered. Deactivations in the event of overload or regularization of the load in the supply network also have/has to be assumed. Further data transmitted from the supply network can arrive and require an additional reaction on the part of the household appliance. The control structure of the household appliance should be tailored to such a situation. To this end reference is made to FIG. 2, where components of identical function to those in FIG. 1 are either given the same designation or a number that is 10 higher. According to the invention this is because every actuator (18 (18.1, 18.2 . . . 18.n) is not only subjected to a fixed power by way of the respective power amplifier or power switching stage 17 but this can take place with discrete values, by taking parameters 20 into account when activating the respective actuator 18. Therefore an actuator 18, which per se would draw a very high level of power—if no other measures were taken—e.g. for resistance heating to heat up wash liquor, can be activated by said parameterization in a number of discrete values, in other words with reduced power. This allows ongoing operation of the household appliance to be maintained inter alia, when a limit on power uptake by the household appliance has to be taken into account as a predefined command from the supply network or when a high energy tariff is present and has to be taken into account, without provision having to be made for having to interrupt the operation of the household appliance completely for a time, e.g. for the entire duration of the present higher energy tariff. Also, if the actuator is an electric motor drive, recovery can be initiated by way of a certain parameter 20 for certain process states. It is evident here that the power switching stage 17 for the actuator 18 in question then has to be designed for energy feedback.

The parameterization with parameters 20 of the actuators 18 (18.1 to 18.n) of the household appliance, in other words the very different possible activation by way of their respective power amplifiers or power switching stages 17 (17.1 to 17.n) means that there is a very wide range of options for the process sequence to proceed from a process start to a process end. As can be seen, the power stages 17 are activated by way of the expander 16 from the electronic controller 12. It should also be assumed here that the operator wishes to tailor the settings data, which is brought together and made available in the control part 13, in a developed manner to the options of a novel supply network EVN' with intelligence or at least changing, different energy tariffs, possibly even during the process sequence. It may possibly be the intention of the operator to achieve a fast process result, with higher costs for the energy drawn being accepted. It may also be the intention of the operator just to operate the household appliance when the low electricity tariff is available, in which case interruptions to the process sequence are accepted. It may also be that it must also be taken into account that detergent components may have to be added later, if their effect has decreased due to the acceptance of an interruption in the process sequence. Saving the costs of purchasing electrical energy may therefore incur additional costs for detergent or detergent components. It should be clear from the above that by changing the data situation relating to the settings data (see also control part 13), which is initiated by the user, and the data situation relating to the transmitted data from the supply network EVN', which is available at a data interface 15, e.g. associated with intelligent or smart power management SM generally with associated smart meters (SMART METER), the electronic controller 12 of the controller 10 must deal with very complex requirements. With a process sequence with changing settings data and network data it should therefore be assumed that the sequence from process start to process end can no longer be considered as a straight line.

A process sequence based on the consideration of such a wide range of input data (settings data from the user, data originating from the supply network) can no longer be achieved by a simple (e.g. matrix-type) assignment of input data to the resulting program sequences in or by the controller. Approaches with which a portable storage medium is first defined by way of an external computer for specifying an individual or optimum program from a plurality of possible programs, as disclosed in DE 10 2009 046 720 A1, are less feasible for the simplest appliance utilization possible. It should of course also be taken into account that during the process sequence the settings data is changed, for example by interactive action on the part of the user, as is the data coming from the supply network EVN'. It is therefore necessary to replace the process sequence selected at the start of the process initially—as optimum—with a changed process sequence for the further operation of the household appliance, as the data situation may require this. This change can take place a number of times during the course of the process.

As a result with the household appliance, the controller of which is designed with a view to the novel supply network EVN' and operated on this, the respective process result is no longer achieved directly as an objective (for example washed and drained laundry in the case of a washing machine, cleaned and dried dishes in the case of a dishwasher) (see above: as when a vehicle reaches its destination traveling in a straight line from its starting point), rather a very complex route is covered, like the route of a vehicle passing through a large number of junctions with various direction changes. In such a situation initial tests have shown, even though is seems obvious in retrospect, that when equipping the controller 11 or the computer-like controller 12 of the household appliance, a region must be provided, in which an algorithm, in particular a graph algorithm, is implemented. Only thus is it possible to determine the selection of a route, which presents itself as a succession of individual, incomplete or partial program segments, without also requiring external computer power. The controller to be designed for the novel supply network EVN' can therefore—as has been surprisingly proven—be operated with a graph algorithm as an independent unit. The graph algorithm selected can preferably be Dijkstra's algorithm or another algorithm from the greedy algorithm class. If the input data (settings data and data from the network EVN') of the controller is understood in the sense of existing probabilities, it would be possible to implement a Bayes network to obtain the output data for activating the actuators taking into account their parameters to be adjusted.

With reference to FIG. 2 it should be noted again that the operating data, in other words data captured by measuring sensors during the process and processed by the control part 14, can also be supplied directly to the electronic controller, so that the control part 19, which is intended to implement the graph algorithm, for example Dijkstra's algorithm, exchanges data directly with the electronic controller 12. A computer-like controller with an appropriately selected microprocessor can however also comprise a number of the control parts listed above, as the person skilled in the art knows. The abovementioned data exchange then takes place within the selected microprocessor. It should also be taken into account that the data network of the energy supply network can on the one hand also be connected physically to this, in other words by means of the energy-transmitting lines, and transmissions, for example Powerline, ZigBee, Z-Wave and so on, can then be utilized, but on the other hand the data transmission can take place for example by radio or by way of the internet with adaptors such as routers and the like, physically separated from the energy-transmitting lines. In the first instance the interface for processing the network data for the household appliance generally follows an interface 15, which is assigned to smart management SM, in other words energy management of the energy supply network EVN' generally with an integrated smart METER. Otherwise said interface, at which the network data for the household appliance is available, follows the internet or radio transmission. From the interface 15 the network data can be forwarded in a wired or wireless manner to the household appliance or its controller 11 or its electronic controller 12.

If a household appliance operates in conjunction with a second household appliance, for example washing machine with tumble dryer, which together can form a washer-dryer stack, in other words both appliances are active, said appliances can either form a data sharing network directly with one another or an exchange of data takes place by way of the data network of the energy supply network EVN. It can then be assumed that when there is a favorable tariff available for electrical energy, the majority of the energy supplied at this favorable tariff will be supplied to the appliance that requires the higher level of power in the process sequence and the other appliance will be switched to a reduced power mode, for example by changing the parameterization of its power stages for activating its actuators, subject to this being reasonable. Reference is also made to DE 10 2008 043 914 A1, which was mentioned above in the introduction.

Figure 3:
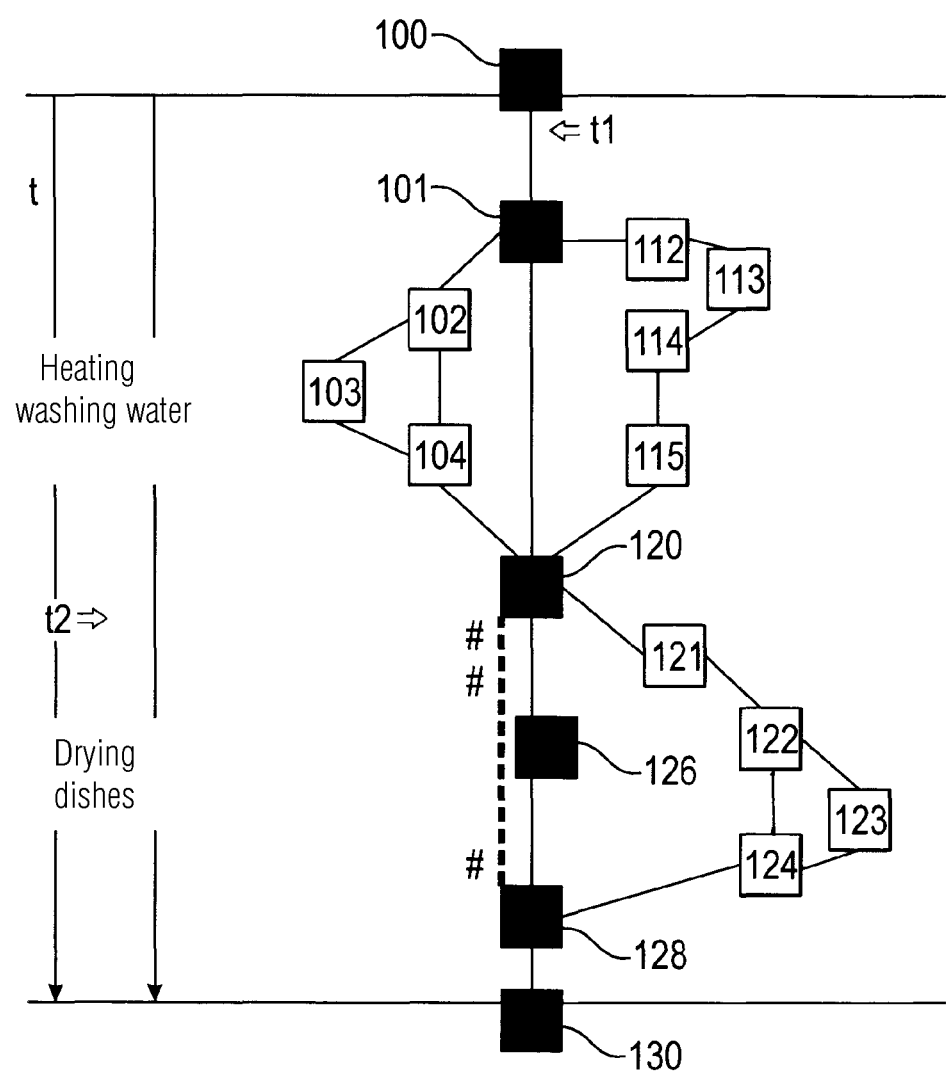
FIG. 3 shows a graphic representation of process sequences of a household appliance during operation on a novel energy supply network having a controller configured in the inventive manner.

We will now look, with reference to FIG. 3, at how a process of a household appliance having a controller 11, which is tailored inventively to the novel energy supply network EVN', operates.

FIG. 3 shows the sequence from a process start (start program, top line) to a process end (end program, bottom line). Reference is made by way of example to a dishwasher. The process states are represented by blocks. The process sequence to date is shown by the black blocks. A timeline t is shown on the left from the top line to the bottom line for the duration of the process. Next to it (on the right) is a process events line. The start of the process takes place with block 100. At 101 a process sequence is still present, as with a controller which is not tailored to an energy supply network with available data relating for example to different tariffs. At t1 the event occurs that the electricity price rises. In contrast to the conventional process profile, the process is continues here, in one instance over the graph which connects the blocks 112, 113, 114, 115 to 120. The other time the graph goes from block 101 to block 102 directly to block 104 or by way of block 103 to block 104 and on to block 120. In the first mentioned variant the appliance delays the heating phase, while in the second variant the appliance heats with a lower heat output, which can be achieved with the parameters to be output for the power stage, which activates the flow-through heater for heating the wash liquor. At t2 the electricity price drops. The appliance heats at a higher power. The process becomes faster (####). This is shown by the graph which connects the black blocks 120-126-128. The program or process end is reached at block 130. Alternatively the process can also operate over the graph, which connects the blocks 121, 122, 124 or by way of 123 to 124 and leads to the black block. This takes into account the fact that the energy input for thermally-based process management—because for example one household appliance operated in the same household is allocated more energy by higher-order energy management—is reduced by the abovementioned parameterization but a practically equivalent result is also achieved by other measures, such as the introduction of rinse aid or an increase in the quantity of circulated air. Generally speaking the process is performed in a very variable manner, with data, which is exchanged directly or indirectly by way of the energy supply network EVN', initiating such variable process management. To this end the household appliance has a controller 11, which is tailored inventively to the novel energy supply network EVN' and is described with reference to FIG. 2.

The invention claimed is:

1. A household appliance having a controller, the controller comprising:
   a first control component embodied as a computer,
   a second control component for settings data,
   a third control component for operating data,
   actuators controlled by amplifiers, wherein first control component determines data for controlling the actuators from the settings data and the operating data, wherein the controller operates on an energy supply network having a data network for exchanging data via the energy supply network, and
   a fourth control component connected with the first control component and comprising a graph algorithm, wherein through cooperation of the first control component, the fourth control component and the graph algorithm, the data from the data network for the household appliance are taken into account so as to allow operation of the household appliance always to continue;
   wherein the graph algorithm controls a process sequence of the household appliance by selecting a succession of individual, incomplete or partial program segments for execution in an optimum manner based on the data from the data network for the household appliance.

2. The household appliance of claim 1, wherein the graph algorithm comprises an algorithm from a class of greedy algorithms.

3. The household appliance of claim 2, wherein the graph algorithm comprises a Dijkstra algorithm.

4. The household appliance of claim 1, wherein the actuators are controlled by the amplifiers by way of parameterization.

5. The household appliance of claim 4, wherein a parameter for a respective actuator is determined by the first control component and is supplied to an input of the amplifier of the respective actuator.

6. The household appliance of claim 4, wherein a specified parameter initiates a recovery of an actuator embodies as an electric motor drive.

7. The household appliance of claim 1, wherein the controller comprises an interface for exchanging data with the energy supply network.

8. The household appliance of claim 7, wherein the interface is assigned to a smart meter.

9. The household appliance of claim 7, wherein the data provided to the controller as data originating from the energy supply network also include data comprising information about a current tariff for consumed energy.

10. The household appliance of claim 7, wherein data present during the exchange of the data also include data that enable energy management of at least one additional household appliance.

11. The household appliance of claim 1, wherein the data network for exchanging data comprises at least one of an energy-transmitting line of the energy supply network, the Internet and a radio transmission link.

12. The household appliance of claim 1, wherein the controller safeguards data of a last-executed process segment when the energy supply network is switched off.

13. A method for operating a controller of a household appliance on an energy supply network providing data transmission of data via the energy supply network, the method comprising:

processing with a computer settings data of a controller, operating data from a process of the household appliance and data from the energy supply network for determining control variables for actuators of the household appliance, wherein the computer takes into account a graph algorithm when executing process steps, so that modified process sequences of the household appliance that are modified based on data from the data network can be linked to one another so as to allow operation of the household appliance to always continue; and wherein the graph algorithm controls a process sequence of the household appliance by selecting a succession of individual, incomplete or partial program segments for execution in an optimum manner based on the data from the data network for the household appliance.

14. The method of claim 13, wherein the graph algorithm comprises an algorithm from a class of greedy algorithms.

15. The method of claim 14, wherein the graph algorithm comprises a Dijkstra's algorithm.

16. The method of claim 13, wherein the actuators are controlled by parameterization using a plurality of discrete values.

17. The method of claim 13, wherein data from the energy supply network are processed, with the data having information about a currently available tariff for the consumed energy or for a restrictive target value for reducing energy consumption of the household appliance operated by the controller.

18. The method of claim 13, wherein the data are exchanged via the energy supply network with at least one additional household appliance for distributing available energy between the household appliance and the at least one additional household appliance.

19. The method of claim 13, wherein data representing a process step that was executed last are safeguarded when supply of energy from the energy supply network is prevented.

20. The method of claim 13, wherein data are transmitted via the energy supply network by way of Powerline, Z-Wave or ZigBee.

* * * * *